E. E. HAWKINS.
Whip-Socket.

No. 214,131. Patented April 8, 1879.

WITNESSES:
Henry N. Miller
C. Sedgwick

INVENTOR:
E. E. Hawkins
BY Munn & Co
ATTORNEYS.

UNITED STATES PATENT OFFICE.

ELBERT E. HAWKINS, OF NEW LISBON, NEW YORK.

IMPROVEMENT IN WHIP-SOCKETS.

Specification forming part of Letters Patent No. 214,131, dated April 8, 1879; application filed January 29, 1879.

*To all whom it may concern:*

Be it known that I, ELBERT EUGENE HAWKINS, of New Lisbon, in the county of Otsego and State of New York, have invented a new and useful Improvement in Whip-Sockets, of which the following is a specification.

Figure 1:
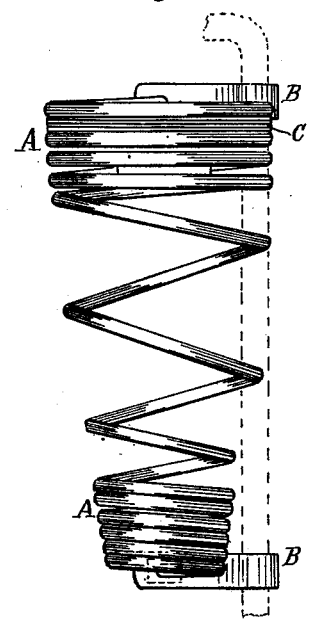
Figure 2:
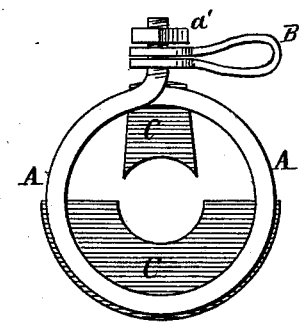

Figure 1 is a side view of my improved socket. Fig. 2 is a top view of the same.

Similar letters of reference indicate corresponding parts.

The object of this invention is to furnish an improved whip-socket for buggies and other vehicles, which shall be simple in construction, inexpensive in manufacture, strong, and durable.

The invention consists in a whip-socket for vehicles formed of wire coiled spirally; in a whip-socket for vehicles formed of wire coiled spirally, with its upper coils close together, and with its lower coils close together and tapered; in the combination of the U-clasps with the bent-out ends of the wire of the socket, for securing the said socket to the frame of the dash; and in the combination of the pieces of rubber having their inner edges notched or pointed with the upper coils of the socket, as hereinafter fully described.

A represents the socket, which is made of wire coiled spirally. The upper coils are close together, and are larger than the handle of the whip to be placed in the socket. The lower coils are close together, and are tapered so that the end of the whip-handle may fit into the seat thus formed and be held steady. The middle or intermediate coils are made more open.

If desired, the socket A may be formed by coiling a wire in a regular spiral from top to bottom, and with the coils close together or at a little distance from each other. The ends of the wire that form the socket A are bent out at right angles, and have screw-threads formed upon them to receive the nuts $a'$.

B represents clasps, of sheet metal, bent in U shape, to pass around and fit upon the end bar of the dash-frame. The ends of the wire of the socket A are then passed through the holes in the ends of the arms of the clasps B and through holes in the leather of the dash, and the nuts $a'$ are screwed upon them.

Pieces of rubber C, with circular notches or with points upon their inner edges, are secured to and between the upper coils of the socket A, to bear against the whip-handle and hold it in the middle part of the socket, to keep it erect and to prevent it from being worn.

Having thus described my invention, I claim as new and desire to secure by Letters Patent—

1. A whip-socket for vehicles formed of wire coiled spirally, substantially as herein shown and described.

2. A whip-socket, A, for vehicles formed of wire coiled spirally, with its upper coils close together, and with its lower coils close together and tapered, substantially as herein shown and described.

3. The combination of the U-clasps B with the bent-out ends of the wire of the socket A, for securing the said socket to the frame of the dash, substantially as herein shown and described.

ELBERT EUGENE HAWKINS.

Witnesses:
 CHARLES A. MOTT,
 C. L. NEARING.